(No Model.)

C. BOUL.
POTATO DIGGER.

No. 299,107. Patented May 27, 1884.

Attest:
Charles Pickles
Wm. E. Plant

Inventor:
Chrisostomus Boul
by C. D. Moody, atty

UNITED STATES PATENT OFFICE.

CHRISOSTOMUS BOUL, OF WEST BELLEVILLE, ILLINOIS.

POTATO-DIGGER.

SPECIFICATION forming part of Letters Patent No. 299,107, dated May 27, 1884.

Application filed November 1, 1883. (No model.)

*To all whom it may concern:*

Be it known that I, CHRISOSTOMUS BOUL, of West Belleville, Illinois, have made a new and useful Improvement in Potato-Diggers, of which the following is a full, clear, and exact description, reference being had to the annexed drawings, making part of this specification, in which—

Figure 1:
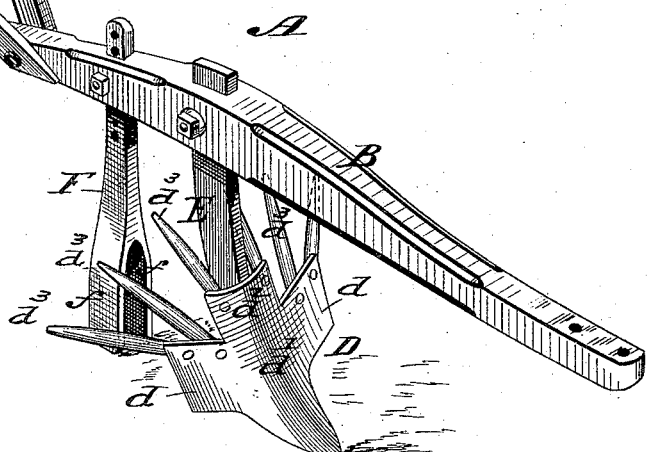
Figure 2:
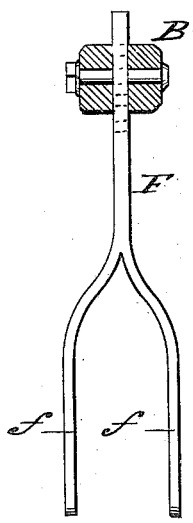

Figure 1 is a view in perspective of the improvement, and Fig. 2 a vertical cross-section taken through the beam in front of the arm used to steady the implement.

This invention relates to the shape of the shovel, and to the fingers thereto attached. It also has reference to the means used to steady the implement.

A represents the improved digger.

B represents the beam, and C C the handles. The shovel D is attached to the beam by means of the standard E. The noticeable feature of the shovel is the wings $d\ d$, which project laterally at each side from the main part $d'$ of the shovel, substantially as shown in Fig. 1. The shovel is also extended at $d^2$ upward and backward. The fingers $d^3\ d^3$ project rearwardly and upwardly from the shovel, substantially as shown. The wings $d\ d$ of the shovel cause the dirt to be thrown more advantageously to each side, and prevent it from falling back upon and covering the potatoes as they are brought to the surface by the action of the implement. The extension $d^2$ is also useful, in connection with the wings $d\ d$, in causing the earth to be properly loosened and disposed, so as to facilitate the digging operation. The wings $d\ d$ cause the dirt, as stated, to be thrown to one side, and the potatoes fall into the spaces between the fingers $d^3\ d^3$ and the extension $d^2$. The fingers $d^3\ d^3$ operate to separate the potatoes from the earth after the earth has been opened and moved by the shovel in the manner described.

It is very important, in using this implement, that it should be guided steadily through the ground. To this end I employ the arm F, which is attached to the beam in rear of the shovel, and preferably so as to be vertically adjustable in the beam. This arm F, at its lower end, is forked, as shown in Figs. 1 and 2. The object of the forks $f\ f$ is this: The center of the furrow made by the shovel is necessarily the deepest part of the furrow, and it is undesirable to use an arm which would have to be extended so as to enter the hard ground in the center of the furrow. Therefore the arm F is forked, as stated, and the forks at each side of the furrow can bear against the earth, and thereby steady the implement, the fork $f$ at one side of the furrow preventing the implement from swaying in that direction, and the other fork $f$, at the opposite side of the furrow, preventing the implement from swaying in that direction.

I claim—

In a potato-digger, a vertical rear support, F, formed of a single piece adjustably secured directly to the beam B, and constructed with forks $f\ f$, which bear on the ground, in combination with a potato-digging shovel having wings $d\ d$, a central upward extension, $d^2$, and radiating fingers $d^3$, all constructed and adapted to operate substantially in the manner and for the purposes described.

Witness my hand this 30th June, 1883.

CHRISOSTOMUS BOUL.

Witnesses:
C. D. MOODY,
C. T. BISER.